(12) United States Patent
Raby (10) Patent No.: US 11,751,274 B2
(45) Date of Patent: Sep. 5, 2023

(54) METHOD FOR MANAGING A COMMUNICATION CHANNEL

(71) Applicant: SAGEMCOM BROADBAND SAS, Rueil Malmaison (FR)

(72) Inventor: Florent Raby, Rueil Malmaison (FR)

(73) Assignee: SAGEMCOM BROADBAND SAS, Rueil-Malmaison (FR)

( * ) Notice: Subject to any disclaimer, the term of this patent is extended or adjusted under 35 U.S.C. 154(b) by 29 days.

(21) Appl. No.: 16/973,300

(22) PCT Filed: Jun. 18, 2019

(86) PCT No.: PCT/EP2019/065946
§ 371 (c)(1),
(2) Date: Dec. 8, 2020

(87) PCT Pub. No.: WO2020/002037
PCT Pub. Date: Jan. 2, 2020

(65) Prior Publication Data
US 2021/0251035 A1    Aug. 12, 2021

(30) Foreign Application Priority Data

Jun. 26, 2018  (FR) ........................................ 1855710

(51) Int. Cl.
*H04W 76/19* (2018.01)
*H04W 76/23* (2018.01)
(Continued)

(52) U.S. Cl.
CPC .............. *H04W 76/23* (2018.02); *H04L 5/06* (2013.01); *H04W 76/14* (2018.02); *H04W 76/19* (2018.02); *H04W 88/04* (2013.01); *H04W 84/12* (2013.01)

(58) Field of Classification Search
CPC ..... H04W 84/12; H04W 88/04; H04W 76/19; H04W 76/14; H04L 5/06
See application file for complete search history.

(56) References Cited

U.S. PATENT DOCUMENTS 10,419,103 B1 *  9/2019  Perdew .............. H04B 7/18506
2002/0158801 A1 * 10/2002  Crilly, Jr. ............. H01Q 3/2605
                                                        342/378
(Continued)

FOREIGN PATENT DOCUMENTS

WO     2010/138935 A2    12/2010

OTHER PUBLICATIONS

Qualcomm Inc Seeks Patent for 2 Enbsenb S-RLF Procedures for Managing Secondary eNB SeNB Radio Link Failure S-RLF in Dual Connectivity Scenarios, Global IP News (Year: 2018).*

(Continued)

*Primary Examiner* — Hanh N Nguyen
(74) *Attorney, Agent, or Firm* — Oliff PLC; R. Brian Drozd (57) ABSTRACT

A method for managing a communication channel used by a plurality of Wi-Fi devices of a Wi-Fi network of the backhaul type for implementing a backhaul network in said Wi-Fi network. A first Wi-Fi device in the plurality performs the method and comprises: detecting a disconnection from an initial channel used by the plurality of Wi-Fi devices for implementing the backhaul network of a second Wi-Fi device in the plurality connected directly to the first Wi-Fi device; listening on a backup channel, to which the second Wi-Fi device is able to migrate to implement the backhaul network in the event of detection, by the second Wi-Fi device, of a radar signal on the initial channel; causing the first Wi-Fi device to migrate to the backup channel in the event of reception on the backup channel by the first Wi-Fi (Continued)

device of a frame containing an identifier of the second device.

9 Claims, 4 Drawing Sheets

(51) Int. Cl.
*H04W 76/14* (2018.01)
*H04L 5/06* (2006.01)
*H04W 88/04* (2009.01)
*H04W 84/12* (2009.01)

(56) References Cited

U.S. PATENT DOCUMENTS

| | | | | |
|---|---|---|---|---|
| 2004/0156336 A1* | 8/2004 | McFarland | | H04L 1/22 |
| | | | | 370/341 |
| 2004/0224637 A1* | 11/2004 | Silva | | H04W 72/046 |
| | | | | 455/562.1 |
| 2012/0258749 A1* | 10/2012 | Lenzini | | H04W 16/14 |
| | | | | 455/509 |
| 2013/0135995 A1* | 5/2013 | Wu | | H04W 36/06 |
| | | | | 370/252 |
| 2015/0156645 A1* | 6/2015 | Ponnuswamy | | H04W 24/06 |
| | | | | 370/241 |
| 2016/0007273 A1* | 1/2016 | Farid | | H04W 16/02 |
| | | | | 370/329 |
| 2017/0135104 A1* | 5/2017 | Emmanuel | | H04L 43/0888 |
| 2017/0272273 A1 | 9/2017 | Singla et al. | | |
| 2019/0239096 A1* | 8/2019 | Patwardhan | | H04W 88/10 |
| 2019/0342795 A1* | 11/2019 | McFarland | | H04W 28/18 |

OTHER PUBLICATIONS

Jul. 24, 2019 International Search Report issued in International Patent Application No. PCT/EP2019/065946.

* cited by examiner

METHOD FOR MANAGING A COMMUNICATION CHANNEL

The invention relates to a method for managing a communication channel used by a plurality of Wi-Fi devices of a Wi-Fi network of the backhaul type for implementing a backhaul network in said Wi-Fi network, a device and a system using the method.

Wi-Fi technology has, at the present time, become almost essential for using wireless local area networks (WLANs). Wi-Fi is a set of wireless communication protocols governed by standards in the IEEE 802.11 group (ISO/IEC 8802-11). By means of the Wi-Fi standards, it is possible to create high-speed WLAN networks. Over the years, Wi-Fi technology has continued to evolve and allows higher and higher bit rates. Mention can thus be made of IEEE 802.11b, which allows 11 theoretical Mbit/s, IEEE 802.11a and IEEE 802.11g, which allow 54 theoretical Mbit/s, IEEE 802.11n, which allows 600 theoretical Mbit/s, and the most recent IEEE 802.11ac, which allows 1.3 Gbit/s. Some Wi-Fi standards, such as IEEE 802.11b, use a so-called 2.4 GHz frequency band, whereas other Wi-Fi standards, such as IEEE 802.11c, use a so-called 5 GHz frequency band.

The standards in the IEEE 802.11 group define two operating modes:
- a so-called backhaul mode wherein each Wi-Fi terminal must connect to a Wi-Fi device functioning in access point mode;
- a so-called Ad-Hoc mode wherein the Wi-Fi terminals communicate with each other without passing through a Wi-Fi device functioning in access point mode.

In backhaul mode, a set formed by a Wi-Fi device functioning in access point mode and at least one Wi-Fi terminal connected to said Wi-Fi device is referred to as a basic service set (BSS). Each BSS is identified by an identifier called BSSID.

It is possible to connect a plurality of BSSs together in order to constitute an extended service set (ESS). For example, when it is wished to connect two BSSs in order to form an ESS, the Wi-Fi devices functioning in access point mode of each BSS are connected together by a so-called backhaul network, which may be cabled or wireless. The backhaul network enables data and commands managing the network to propagate throughout the ESS. A parent-child hierarchy is then created between the two Wi-Fi devices connected. One of the Wi-Fi devices becomes the parent of the other Wi-Fi device, the other Wi-Fi device becoming the child of the parent Wi-Fi device. The parent Wi-Fi device fulfils a role of access point for the child Wi-Fi device. The child Wi-Fi device fulfils a role of station for the parent Wi-Fi device. A Wi-Fi device that is only a parent in an ESS can therefore just function in access point mode. A Wi-Fi device may however be both parent and child, for example when this Wi-Fi device is an intermediate device for connecting two Wi-Fi devices functioning in access point mode of two different BSSs. In this case, an intermediate Wi-Fi device must be able to function in access point mode and in station mode.

A backhaul network must transport a significant quantity of data reliably. When it is implemented in the form of a wireless network, it is in general supported by a Wi-Fi channel offering good performance, in particular in the 5 GHz frequency band. However, a part of this frequency band is potentially used by radars, in particular the UNII-2 (Unlicensed National Information Infrastructure), UNII-2 extended and UNII-3 frequency bands. It should be noted that the UNII-1 sub-band of the 5 GHz frequency band is not used by radars. It is known that, in some countries, the UNII-2 sub-bands covers a frequency band ranging from 5260 MHz to 5320 MHz and comprises four channels, UNII-2 extended covers a frequency band ranging from 5500 MHz to 5700 MHz and comprises eleven channels, and UNII-3 covers a frequency band ranging from 5745 MHz to 5805 MHz and comprises four channels. In order not to interfere with the functioning of radars, IEEE 802.11h imposes a certain number of rules for cohabitation between the Wi-Fi networks and said radars known by the acronym DFS (Dynamic Frequency Selection). The channels of the frequency sub-bands UNII-2, UNII-2 extended and UNII-3 are moreover normally referred to as DFS channels. The DFS rules mean in particular that:

When a radar signal is detected by a parent Wi-Fi device (i.e. a Wi-Fi device functioning at least in access point mode) on a channel used by the parent Wi-Fi device for implementing a backhaul network, the parent Wi-Fi device should migrate to a channel on which no radar signal has been detected. The parent Wi-Fi device should moreover warn the child Wi-Fi devices with which it is associated of the migration. It can do this by inserting a CSA (Channel Switch Announcement) element in a beacon frame. It is also possible to announce the migration by transmitting a priority action frame containing the CSA element. In addition to announcing the change of channel, the CSA element gives an identifier of the channel to which to migrate.

The parent Wi-Fi device should check the availability of the unused channels (if these channels are DFS channels). If, during a predefined period, no radar signal is detected on these channels, these channels are declared to be available.

Each channel abandoned following a detection of a radar signal is abandoned for a predefined period NOP (Non-Occupancy Period). A predefined NOP period is normally fixed at 30 minutes.

A detection of a radar signal can therefore result in a temporary cutting off of the backhaul network as long as a channel free from any radar signal has not been found.

Moreover, the IEEE 802.11 standards do not make provision for the beacon frames or the priority action frames containing the CSA elements to be acknowledged by the destination thereof. A parent Wi-Fi device that has sent such a frame does not know whether this frame has been received, but will not re-send the frame for all that. However, it happens that some frames are lost. The loss of a frame containing a CSA element means that some child Wi-Fi devices are not informed of a change of channel of their parent Wi-Fi device and will therefore continue to send on a channel that they should leave free for the radar signals.

In addition, in some cases, the radar signal is detected not by a parent Wi-Fi device but by a child Wi-Fi device. The child Wi-Fi device will then disconnect from the channel on which the radar signal was detected. It would then be necessary for the child Wi-Fi device to warn its parent Wi-Fi device of the detection of the radar signal. However, at the present time, a child Wi-Fi device has no means of warning its parent Wi-Fi device of the detection of a radar signal. For example, a child Wi-Fi device cannot send a frame containing a CSA element in the direction of its parent Wi-Fi device.

It is desirable to overcome these drawbacks of the prior art. It is in particular desirable to propose a method enabling each parent Wi-Fi device (i.e. a Wi-Fi device functioning at least in access point mode) and each child Wi-Fi device (i.e. a Wi-Fi device functioning at least in station mode) connected to a backhaul network using a channel on which a radar signal has been detected, to migrate quickly to another channel in the event of loss of frames containing a CSA element in order to avoid or limit in time a disconnection of said backhaul network.

It is moreover desirable to propose a method that is simple to implement at low cost.

According to a first aspect of the present invention, the present invention relates to a method for managing a communication channel used by a plurality of Wi-Fi devices of a Wi-Fi network of the backhaul type in order to implement a backhaul network in said Wi-Fi network, the method being executed by a first Wi-Fi device in the plurality and comprising: detecting a disconnection from an initial channel used by the plurality of Wi-Fi devices for implementing the backhaul network of a second Wi-Fi device in the plurality connected directly to the first device; listening on at least one communication channel, referred to as a backup channel, to which the second Wi-Fi device is able to migrate in order to implement the backhaul network in the event of detection, by the second Wi-Fi device, of a radar signal on the initial channel; causing the first Wi-Fi device to migrate to the backup channel in the event of reception on the backup channel by the first Wi-Fi device of a frame containing an identifier of the second device; and remaining on the backup channel as long as a period since a last detection of a radar signal on the initial channel is not greater than or equal to a predefined period.

Predefining to which frequency sub-band or to which communication channel each Wi-Fi device used for implementing the backhaul network will migrate enables each Wi-Fi device to know how the other Wi-Fi devices would behave in the event of the detection of a radar signal. Thus, in the event of disconnection of a second Wi-Fi device from the initial channel, a first device can identify whether the reason for such disconnection is a detection of a radar signal if it detects that the second device has reconnected to the backup channel.

According to one embodiment, the initial channel is a channel of a sub-band, referred to as the initial sub-band, of a frequency band that can be used by a Wi-Fi network wherein a detection of a radar signal is possible, the backup channel being a channel of a predefined sub-band, referred to as a backup sub-band, of a frequency band that can be used by a Wi-Fi network, the initial and backup sub-bands being different.

According to one embodiment, the backup sub-band is a sub-band of a frequency sub-band that can be used by a Wi-Fi network whereon no detection of a radar signal is possible.

According to one embodiment, the backup channel is predefined in the backup sub-band.

According to one embodiment, each Wi-Fi device in the plurality comprises a plurality of radio modules, at least one first radio module being used for implementing the backhaul network using the initial channel and at least one second radio module being used for implementing an access network enabling Wi-Fi terminals to connect to one of the Wi-Fi devices implementing the backhaul network, and in that, at each migration of a Wi-Fi device in the plurality to a backup channel, the Wi-Fi device uses a second radio module for communicating on the backup channel.

According to one embodiment, each Wi-Fi device in the plurality comprises a module, referred to as an access-point module, adapted for causing said Wi-Fi device to function in access-point mode in the backhaul network, and a module, referred to as a station module, adapted for causing said Wi-Fi device to function in station mode in the backhaul network, the first Wi-Fi device functioning in access-point mode vis-à-vis the second Wi-Fi device, which functions in station mode vis-à-vis the first Wi-Fi device, or the first Wi-Fi device functioning in station mode vis-à-vis the second Wi-Fi device which functions in access-point mode vis-à-vis the first Wi-Fi device.

According to a second aspect of the invention, the invention relates to a Wi-Fi device included in a plurality of Wi-Fi devices in a Wi-Fi network of the backhaul type, the plurality of Wi-Fi devices implementing a backhaul network in the Wi-Fi network. The Wi-Fi device, referred to as the first Wi-Fi device, comprises: detection means for detecting a disconnection from an initial channel used by the plurality of Wi-Fi devices for implementing the backhaul network of a second Wi-Fi device in the plurality connected directly to the first Wi-Fi device; listening means for listening on at least one communication channel, referred to as a backup channel, to which the second Wi-Fi device is able to migrate in order to implement the backhaul network in the event of detection, by the second Wi-Fi device, of a radar signal on the initial channel; migration means for causing the first Wi-Fi device to migrate to the backup channel in the event of reception on the backup channel by the first Wi-Fi device of a frame containing an identifier of the second Wi-Fi device; and decision means for deciding when to return to the initial channel according to a length of time since a last detection of a radar signal on the initial channel.

According to a third aspect of the invention, the invention relates to a system comprising a plurality of Wi-Fi devices according to the second aspect, each Wi-Fi device in the plurality comprising a module, referred to as an access-point module, adapted for causing said Wi-Fi device to function in access-point mode in the backhaul network, and a module, referred to as a station module, adapted for causing the Wi-Fi device to function in station mode in the backhaul network, the Wi-Fi devices in the plurality being organised in a parent/child hierarchy, a first Wi-Fi device in the plurality being the parent of a second Wi-Fi device in the plurality when it is functioning in access-point mode vis-à-vis the second Wi-Fi device, which for its part functions in station mode vis-à-vis the first Wi-Fi device, the plurality of Wi-Fi devices comprising at least one exclusively parent Wi-Fi device, and at least one exclusively child Wi-Fi device.

According to one embodiment, the plurality of Wi-Fi devices comprise at least one conjointly parent and child Wi-Fi device.

According to a fourth aspect of the invention, the invention relates to a computer program comprising instructions for implementing, by a device, the method according to the first aspect, when said program is executed by a processor of said device.

According to a fifth aspect of the invention, the invention relates to storage means, storing a computer program comprising instructions for implementing, by a device, the method according to the first aspect, when said program is executed by a processor of said device.

The features of the invention mentioned above, as well as others, will emerge more clearly from the reading of the following description of an example embodiment, said description being made in relation to the accompanying drawings, among which.

The invention is described hereinafter in a context of a backhaul Wi-Fi network wherein each Wi-Fi device (access point or station) of said network is capable of detecting a radar signal. The invention is also adapted to the case where only some of the Wi-Fi devices are capable of detecting a radar signal.

Figure 1:
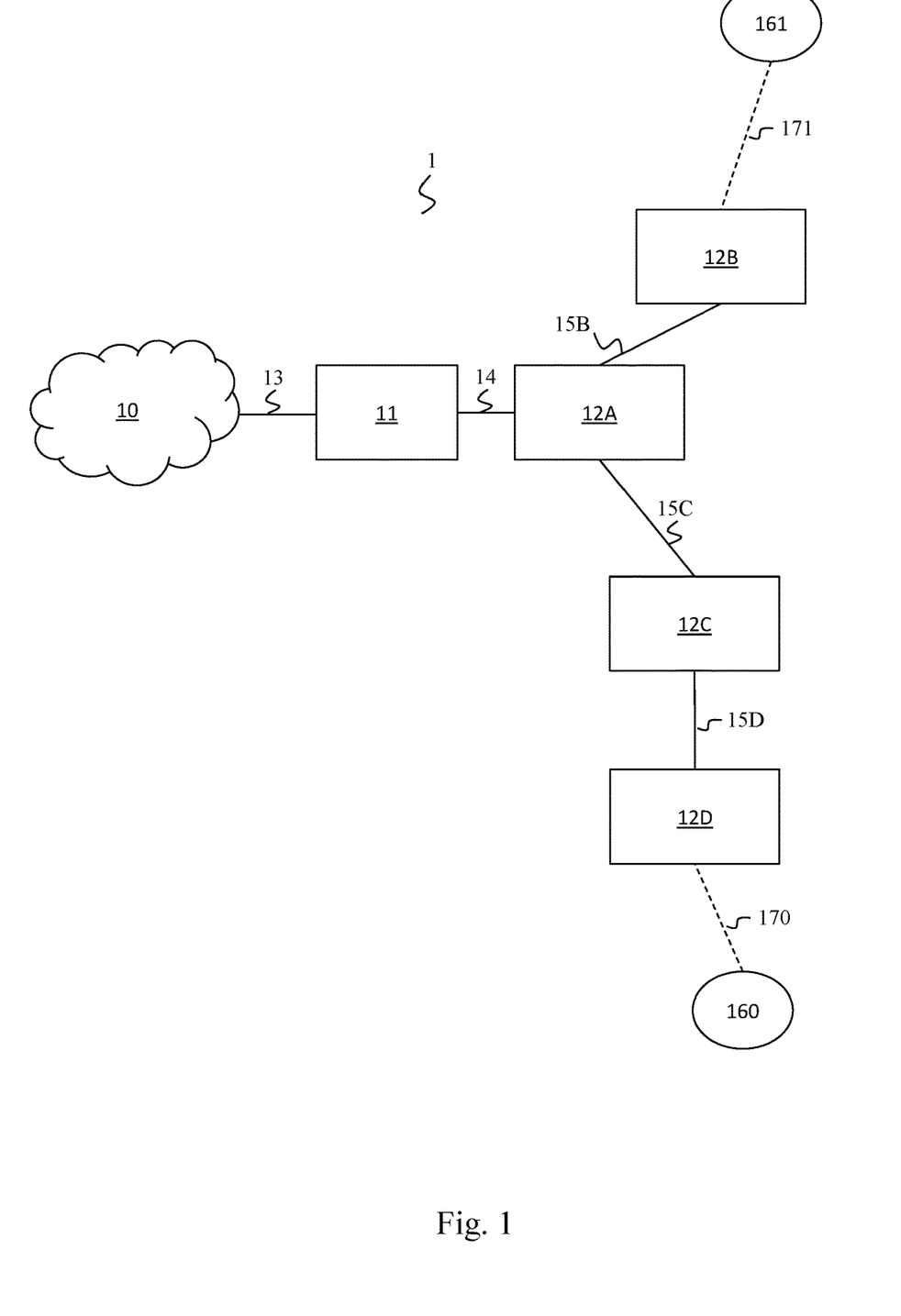
FIG. 1 illustrates schematically a Wi-Fi network wherein the invention is implemented.

FIG. 1 illustrates schematically a Wi-Fi network 1 wherein the invention is implemented.

The network 1 comprises an internet gateway 11 forming a link between a WAN (wide area network) 10 such as the internet or an LAN (local area network) by means of connections 13 and 14. The connection 13 is for example of the cabled type, whereas the connection 14 is of the cabled or wireless type.

The LAN network comprises a plurality of Wi-Fi devices 12A, 12B, 12C and 12D.

In the network 1, the Wi-Fi device 12A fulfils a role of central node since, for communicating with the gateway 11, each other Wi-Fi device of the network 1 must pass through the Wi-Fi device 12A. The Wi-Fi device 12A is a parent Wi-Fi device for the Wi-Fi devices 12B and 12C and the Wi-Fi devices 12B and 12C are child Wi-Fi devices for the Wi-Fi device 12A. The Wi-Fi device 12C is a parent Wi-Fi device for the Wi-Fi device 12D and the Wi-Fi device 12D is a child Wi-Fi device for the Wi-Fi device 12C.

The Wi-Fi device 12A communicates with the Wi-Fi device 12B (and respectively 12C) via a Wi-Fi connection 15B (and respectively 15C). The Wi-Fi device 12C communicates with the Wi-Fi device 12D via a Wi-Fi connection 15D.

The network 1 also comprises two Wi-Fi terminals 160 and 161. The Wi-Fi terminal 160 is connected to the Wi-Fi device 12D by a Wi-Fi connection 170. The Wi-Fi terminal 161 is connected to the Wi-Fi device 12B by a Wi-Fi connection 171. The Wi-Fi connections 170 and 171 form an access ("fronthaul") network respectively for the Wi-Fi device 12D and for the Wi-Fi device 12B.

The Wi-Fi devices 12A, 12B, 12C and 12D and the Wi-Fi terminals 160 and 161 form a Wi-Fi network. The Wi-Fi devices 12A, 12B, 12C and 12D form a backhaul network for said Wi-Fi network.

Figure 2A:
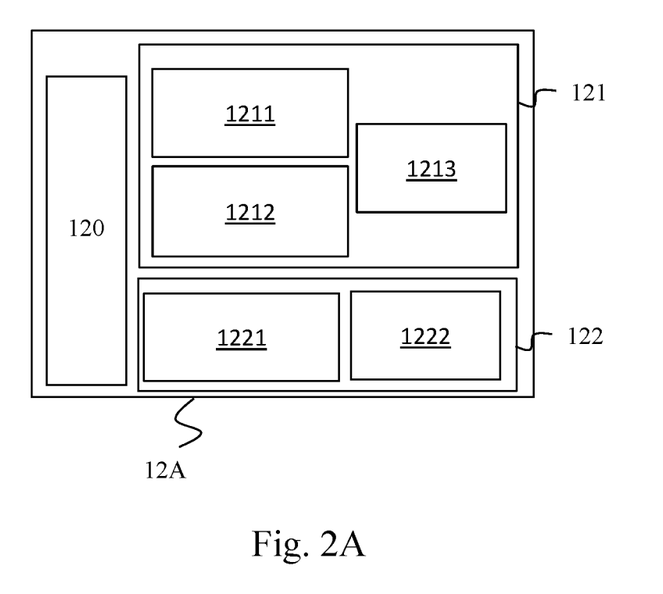
FIG. 2A illustrates schematically in detail each Wi-Fi device of the Wi-Fi network wherein the invention is implemented.

FIG. 2A illustrates schematically in detail each Wi-Fi device of the network 1.

In FIG. 1, we take the example of the Wi-Fi device 12A. The Wi-Fi devices 12B, 12C and 12D are however identical to the Wi-Fi device 12A.

The Wi-Fi device 12A comprises a processing module 120, a backhaul module 121, responsible for implementing a backhaul network used by the device 12A, and a fronthaul module 122, responsible for implementing a fronthaul network that the device 12A would make available to Wi-Fi terminals.

The backhaul module 121 comprises a module 1211 adapted for causing the Wi-Fi device 12A to function in access-point mode for the backhaul network, referred to as a backhaul access point module, a module 1212 adapted for causing the Wi-Fi device 12A to function in station mode for the backhaul network, referred to as a backhaul station module, and at least one radio module 1213 enabling the backhaul module 121 to communicate physically on the backhaul network.

The fronthaul module 122 comprises at least one module 1221 adapted for causing the Wi-Fi device 12A to function in access-point mode for the fronthaul network, referred to as a fronthaul access point module, and at least one radio module 1222 enabling the fronthaul module 122 to communicate physically on the access network.

Each radio module (i.e. 1213 and 1222) is capable of communicating in a plurality of sub-bands of the 5 GHz band. For example, each radio module is capable of communicating in the sub-bands UNII-1, UNII-2, UNII-2e and UNII-3.

It should be noted that the backhaul 121 and fronthaul 122 modules (and the modules that form them) are capable of communicating with each other using for example a communication bus internal to the Wi-Fi device 12A, not shown.

Figure 2B:
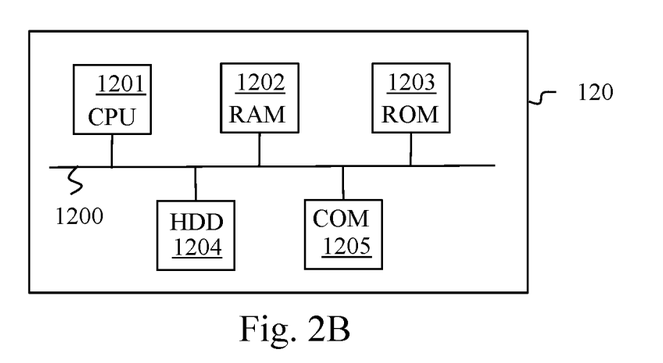
FIG. 2B illustrates schematically a processing module included in a Wi-Fi device.

FIG. 2B illustrates schematically an example of hardware architecture of a processing module 120 included in a Wi-Fi module.

In FIG. 2B, we take the example of the processing module 120 of the Wi-Fi device 12A. The processing modules 120 of the Wi-Fi devices 12B, 12C and 12D are however identical.

According to the example of hardware architecture shown in FIG. 2B, the processing module 120 then comprises, connected by a communication bus 1200: a processor or CPU (central processing unit) 1201; a random access memory RAM 1202; a read only memory ROM 1203; a storage unit such as a hard disk or a storage medium reader, such as an SD (Secure Digital) card reader 1204; at least one communication interface 1205 enabling the processing module 120 to communicate with other modules of the Wi-Fi device 12A and in particular the modules of the backhaul module 121 and the modules of the fronthaul module 122.

The processor 1201 is capable of executing instructions loaded in the RAM 1202 from the ROM 1203, from an external memory (not shown), from a storage medium (such as an SD card), or from a communication network. When the Wi-Fi device 12A is powered up, the processor 1201 is capable of reading instructions from the RAM 1202 and executing them. In one embodiment, these instructions form a computer program causing the execution, by the processor 1201, of the methods described hereinafter in relation to FIGS. 3, 4 and 5.

Figure 3:
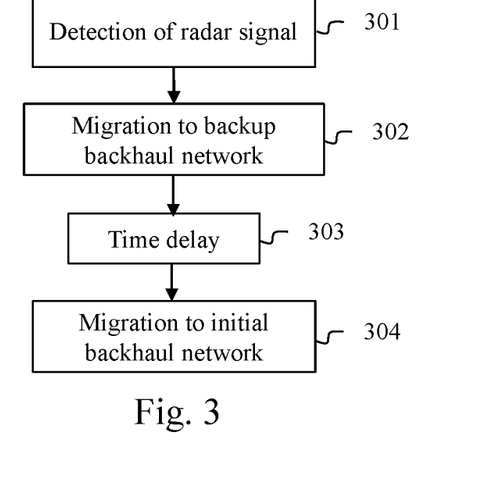
FIG. 3 illustrates schematically a method for migration from a first communication channel to a second communication channel when a radar signal is detected on the first channel.
Figure 4:
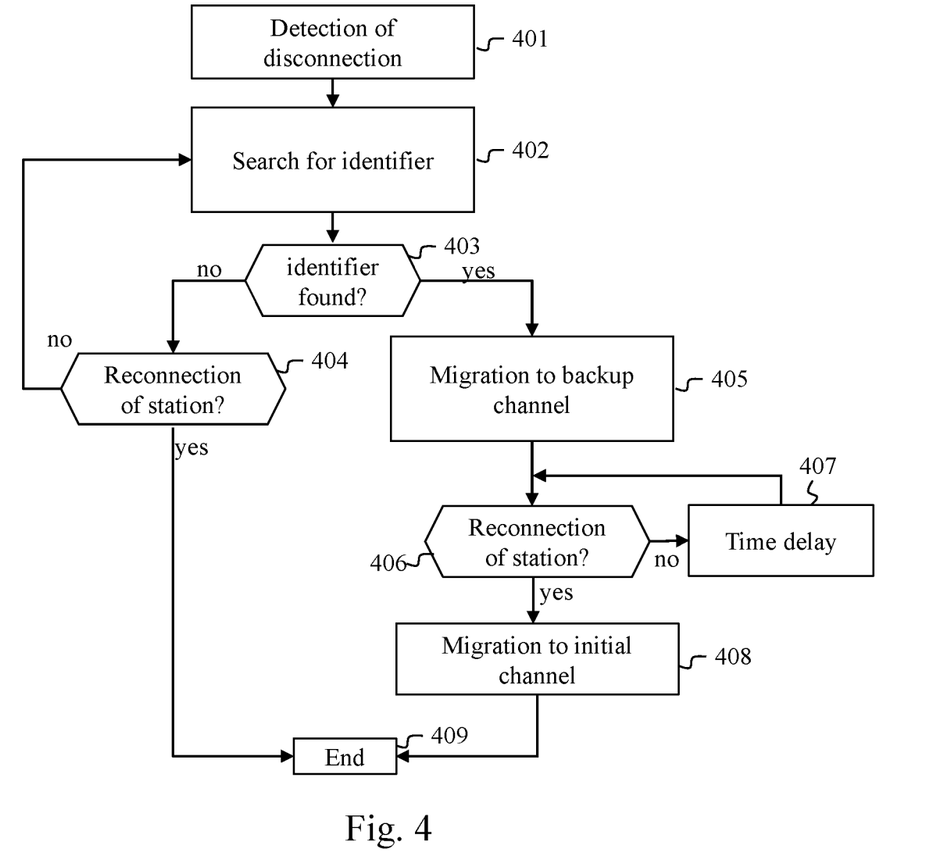
FIG. 4 illustrates schematically a method, executed by a Wi-Fi device fulfilling a role of access point, for managing a communication channel used for implementing a backhaul network, in the event of disconnection of a Wi-Fi device fulfilling a role of station; and, FIG. 5 illustrates schematically a method, executed by a Wi-Fi device fulfilling a role of station, for managing a communication channel used for implementing a backhaul network, in the event of disconnection of a Wi-Fi device fulfilling a role of access point.
Figure 5:
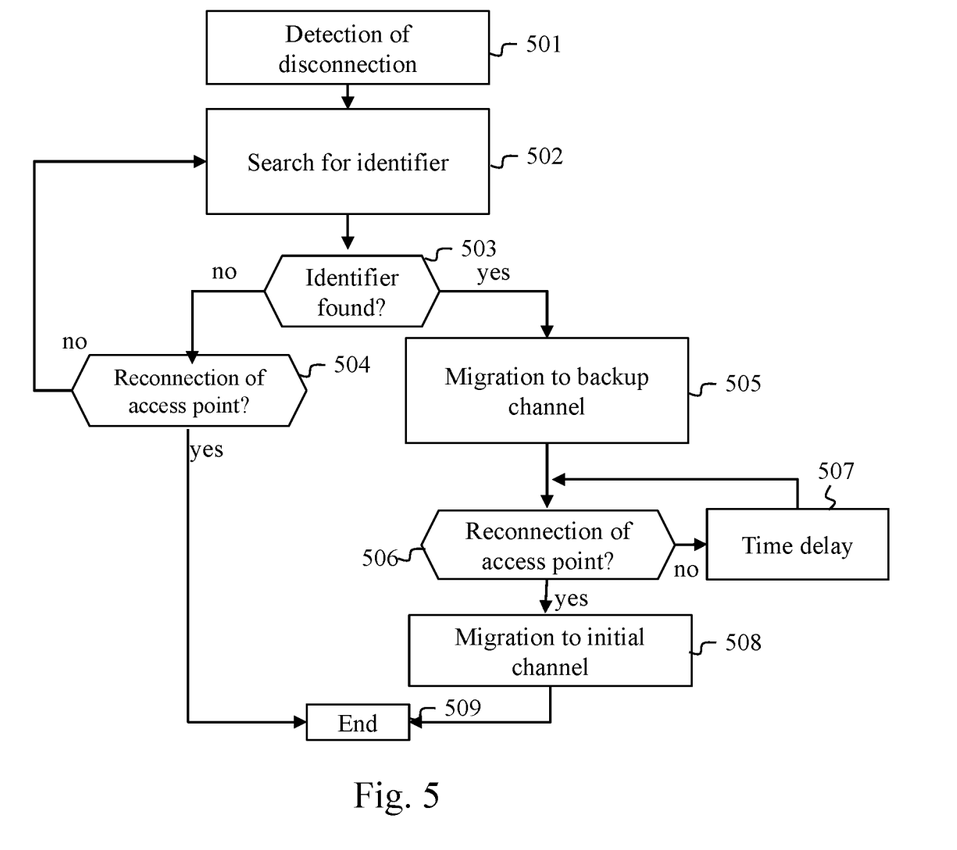

All or some of the methods described in relation to FIGS. 3, 4 and 5 can be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

FIG. 3 illustrates schematically a method for migrating from a first communication channel to a second communication channel when a radar signal is detected on the first channel.

As seen above, each Wi-Fi device of the network 1 uses known means for detecting a radar signal. The detection of a radar signal is hereinafter referred to as DFS detection. Each Wi-Fi device of the network 1 is capable of executing the method described in relation to FIG. 3. We take here the example of the Wi-Fi device 12A, the Wi-Fi devices 12B, 12C and 12D executing the method of FIG. 3 in the same way.

In a step 301, the processing module 120 of the device 12A makes a DFS detection on a channel used for implementing the backhaul network connecting the Wi-Fi device 12A to the Wi-Fi device 12B and to the Wi-Fi device 12C. This channel is hereinafter referred to as the initial channel and belongs to a first frequency sub-band, referred to as the initial sub-band. The initial sub-band is the sub-band UNII-2, UNII2e or UNII-3, since no DFS detection is possible on the sub-band UNII-1. The band UNII-1 is in fact not used by radars.

In a step 302, the processing module 120 causes the backhaul access point 1211 (and therefore the radio module 1213 of the backhaul module 121) to migrate from the initial channel to a channel of a predefined frequency sub-band different from the initial sub-band. The effect of this change of channel is to cause the backhaul network used by the backhaul access point module 1211 to migrate to a new channel. The predefined frequency sub-band is hereinafter referred to as the backup sub-band. Unlike the mechanisms proposed in IEEE 802.11h, the backup sub-band is known in advance and does not have to be determined. The backup sub-band was for example fixed by the manufacturer of the Wi-Fi device 12A or when the Wi-Fi device was installed.

Each Wi-Fi device of the network 1 has knowledge of the backup sub-band that would use all the other Wi-Fi devices of the network 1 in the event of DFS detection. In one embodiment, all the Wi-Fi devices of the network 1 exchange this information at least once or exchange this information whenever this information is updated. This information may for example be broadcast by an operator when the Wi-Fi devices of the network 1 are configured.

In a step 303, the processing module 120 waits for a predefined NOP period for example of 30 minutes.

At the end of the NOP period, in a step 304, the processing module 120 causes the backhaul access point module 1211 (and therefore the radio module 1213 of the backhaul module 121) to migrate from the channel of the backup sub-band to the initial channel. In one embodiment, if the initial channel has undergone a DFS detection for a period NO_DFS preceding the end of the NOP period, the processing module 120 does not cause the backhaul access point 1211 to migrate but leaves the backhaul access point module 1211 on the channel of the backup sub-band.

In the example of the network 1, the Wi-Fi device 12A could in its backhaul module 121 activate only its backhaul access point module 1211, its backhaul station module 1212 being able to remain inactive. Certain Wi-Fi devices of the network 1, such as the Wi-Fi devices 12B and 12D, need to activate in their backhaul module 121 only their backhaul station module 1212. Other Wi-Fi devices of the network 1, such as the Wi-Fi device 12C, must, in their backhaul module 121, activate their backhaul station module 121 and their backhaul access point module 1211. When there is a DFS detection, the processing module 120 of a Wi-Fi device must therefore cause to migrate, to a channel of the backup sub-band, either the backhaul access point module 1211 (and therefore the radio module 1213), or the backhaul station module 1212 (and therefore the radio module 1213), or both. For example, when there is a DFS detection by the Wi-Fi device 12C, the Wi-Fi device 12C must cause the access point module 1211 and the station module 1212 to migrate to a channel of the backup sub-band. When there is a DFS detection by the Wi-Fi device 12B (or respectively 12D), the Wi-Fi device 12B (or respectively 12D) must cause the station module 1212 to migrate to a channel of the backup sub-band.

In one embodiment, the backup sub-band is the sub-band UNII-1 on which no DFS detection is possible. In this case, when there is a DFS detection on the initial channel, the processing module 120A randomly chooses a channel of the sub-band UNII-1.

In one embodiment, the backup sub-band is a predefined sub-band different from the initial sub-band among the sub-bands UNII-2, UNII-2e or UNII-3. In this case, when there is a DFS detection on the initial channel, the processing module 120A randomly chooses a channel of the backup sub-band or randomly chooses a channel of the backup sub-band that has not undergone a DFS detection during the predefined period NO_DFS preceding the DFS detection on the initial channel. The predefined period NO_DFS is for example equal to 20 minutes.

In one embodiment, when the backup sub-band is a predefined sub-band different from the initial sub-band among the sub-bands UNII-2, UNII-2e and UNII-3, the backup sub-band is determined by a procedure performed periodically by the Wi-Fi device 12A. This procedure consists of identifying the sub-band among the sub-bands UNII-2, UNII-2e or UNII-3 wherein the channels undergo the fewest DFS detections.

It should be noted that the channel chosen in the backup sub-band is hereinafter referred to as the backup channel.

In one embodiment, it is not a backup sub-band that is predefined but directly the backup channel, the backup channel belonging to the sub-bands UNII-1, UNII-2, UNII-2e and UNII-3.

In one embodiment, when the backup sub-band is one of the sub-bands UNII-2, UNII-2e and UNII-3, if each channel of the backup sub-band has undergone a DFS detection during the predefined period NO_DFS preceding the DFS detection on the initial channel, the processing module 120 randomly chooses a channel of the sub-band UNII-1.

In one embodiment, when there is a DFS detection, during the migration from an initial channel to a backup channel, the Wi-Fi device changes radio module. The new radio module is then referred to as the backup radio module. For example, during the NOP period, the processing module 120 decides to use the radio module 1222 of the fronthaul module 122 or one of the radio modules 1222 of the fronthaul module 122. In migrating to another radio module that is in the process of being used, the backhaul network used by the backhaul access point module 1211 is caused to migrate more quickly to a channel without DFS detection.

As presented above in relation to FIG. 3, a DFS detection by a Wi-Fi device causes the migration to a channel of a backup sub-band or to a backup channel of an access point module 1211 and/or of the station module 1212 of said Wi-Fi device. So that the Wi-Fi device that made the DFS detection can continue to communicate with its parent Wi-Fi device if such exists and its child Wi-Fi device or devices if such exist, the parent and/or child Wi-Fi devices must make the same migration. As seen above, IEEE 802.11h provides that, in the event of DFS detection, a parent Wi-Fi device warns its child Wi-Fi devices of the migration by sending them a frame comprising a CSA element indicating to which channel to migrate. Since the frame is not acknowledged, it is not certain that it reaches its destination or destinations. Moreover, IEEE 802.11h does not make any provision for a child Wi-Fi device to be able to inform its parent Wi-Fi device that it has migrated to a channel of a backup sub-band or to a backup channel following a DFS detection.

FIG. 4 illustrates schematically a method, executed by a Wi-Fi device fulfilling a role of access point, for managing a communication channel used for implementing a backhaul network, in the case of disconnection of a Wi-Fi device fulfilling a role of station.

The method described in relation to FIG. 4 is for example executed by the Wi-Fi device 12A. It is supposed here that one of the child Wi-Fi devices of the Wi-Fi device 12A has migrated to a backup channel following a DFS detection. The child Wi-Fi device to which the migration relates is for example the device 12C.

In a step 401, the processing module 120 of the Wi-Fi device 12A detects a disconnection of the Wi-Fi device 12C from the channel used for implementing the backhaul network between the Wi-Fi devices 12A and 12C. To do this, the processing module 120 detects that no Wi-Fi connection maintenance frame has been received from the Wi-Fi device 12C during a predefined NO_FRAME period. The NO_FRAME period is for example one minute. At this stage, the Wi-Fi device 12A does not know the reason for the disconnection. It does however know that one possible reason is a DFS detection and that, in this case, according to the embodiments, the Wi-Fi device 12C causes its backhaul station module 1212 to migrate to a channel of a backup sub-band, to a backup channel or to a backup channel of a backup sub-band using a backup radio module.

When the Wi-Fi device 12A knows that, in the event of DFS detection, the Wi-Fi device 12C causes its backhaul station module 1212 to migrate to a channel of a backup sub-band, in a step 402 the processing module 120 uses the radio module 1213 for scanning the channels of the backup sub-band and listens out on each of the channels.

When the Wi-Fi device 12A knows that, in the event of DFS detection, the Wi-Fi device 12C causes its backhaul station module 1212 to migrate to a backup channel, in a step 402 the processing module 120 configures the radio module 1213 so that it listens on the backup channel of the Wi-Fi device 12C.

In a step 403, the processing module 120 determines whether the Wi-Fi device 12A has received at least one identifier of the Wi-Fi device 12C on the backup channel or on one of the channels of the backup sub-band. The identifier is for example an SSID (service set identifier). In the event of detection of an identifier of the Wi-Fi device 12C on the backup channel or on a channel of the backup sub-band, the processing module 120 performs a step 405. Otherwise the processing module 120 performs a step 404.

In the step 404, the processing module 120 determines whether the Wi-Fi device 12C has reconnected to the initial channel. If such is the case, the processing module 120 considers that the disconnection of the Wi-Fi device 12C was merely temporary and that the backhaul network can remain on the initial channel. The processing module 120 then ends the method of FIG. 4 in a step 409. If the Wi-Fi device 12C has not reconnected to the initial channel, the processing module 120 returns to the step 402.

In the step 405, the processing module 120 causes the backhaul access point module 1211 of the Wi-Fi device 12A to migrate to the backup channel used by the Wi-Fi device 12C.

In a step 406, the processing module 120 checks whether the Wi-Fi device 12C has reconnected to the initial channel. If such is not the case, the processing module 120 waits during a predefined period, for example equal to 20 minutes, and returns to the step 406. If the processing module 120 detects that the Wi-Fi device 12C has reconnected to the initial channel, in a step 408 it causes the access point module 1211 of the Wi-Fi device 12A to migrate to the initial channel and ends the method described in relation to FIG. 4 in the step 409. Consequently, as long as a period since the last detection of a radar signal on the initial channel is not greater than or equal to the predefined period of 20 minutes, the backhaul access point module 1211 remains on the backup channel.

It should be noted that, in the case of the example of FIG. 4, the migration of the access point module 1211 of the Wi-Fi device 12A to the backup channel causes the migration of the station module 1212 of the Wi-Fi device 12C onto the same backup channel.

FIG. 4 describes a method implemented by a Wi-Fi device that is the parent of a child Wi-Fi device that has made a DFS detection and has migrated to a backup channel. The Wi-Fi device 12A used in this example is an exclusively parent Wi-Fi device. If the parent Wi-Fi device had been the Wi-Fi device 12C and the child device that made the DFS detection the device 12D, the Wi-Fi device 12C also being the child of the Wi-Fi device 12A, the Wi-Fi device 12C would have had a reaction strictly identical to that of the device 12A faced with the DFS detection of the Wi-Fi device 12C. The Wi-Fi device 12C would have caused solely its backhaul access point module 1211 to switch to the backup channel, but would not have modified its channel used by the backhaul station module 1212.

FIG. 5 illustrates schematically a method, performed by a Wi-Fi device fulfilling a station role, for managing a communication channel used for implementing a backhaul network, in the event of disconnection of a Wi-Fi device fulfilling a role of access point.

The method described in relation to FIG. 4 is for example performed by the Wi-Fi device 12D. It is assumed here that the parent Wi-Fi device of the Wi-Fi device 12D (i.e. the Wi-Fi device 12C) has migrated to a backup channel following a DFS detection, but that no frame containing the CSA element was received by the Wi-Fi device 12D.

In a step 501, the processing module 120 of the Wi-Fi device 12D detects a disconnection of the Wi-Fi device 12C from the channel used for implementing the backhaul network between the Wi-Fi devices 12C and 12D. To do this, the processing module 120 of the Wi-Fi device 12D detects that no Wi-Fi connection maintenance frame has been received by the Wi-Fi device 12C during the predefined NO_FRAME period. At this stage, the Wi-Fi device 12D does not know the reason for the disconnection. It does however know that one possible reason is a DFS detection and that, in this case, according to the embodiments, the Wi-Fi device 12C causes its backhaul access point module 1211 to migrate to a channel of a backup sub-band, to a backup channel or to a backup channel of a backup sub-band using a backup radio module.

When the Wi-Fi device 12D knows that, in the event of a DFS detection, the Wi-Fi device 12C causes its backhaul access point module 1211 to migrate to a channel of a backup sub-band, in a step 502 the processing module 120 uses the radio module 1213 for scanning the channels of the backup sub-band and listens on each of the channels.

When the Wi-Fi device 12D knows that, in the event of a DFS detection, the Wi-Fi device 12C causes its backhaul access point module 121 to migrate to a backup channel, in a step 502 the processing module 120 configures the radio module 1213 so that it listens on the backup channel of the Wi-Fi device 12C.

In a step 503, the processing module 120 determines whether the Wi-Fi device 12D has received at least one frame containing an identifier of the Wi-Fi device 12C on the backup channel or on one of the channels of the backup sub-band. The identifier is for example an SSID (service set identifier). In the case of the reception of a frame containing an identifier of the Wi-Fi device 12C on the backup channel or on a channel of the backup sub-band, the processing module 120 performs a step 505. Otherwise the processing module 120 performs a step 504.

In the step 504, the processing module 120 determines whether the Wi-Fi device 12C has reconnected to the initial channel. If such is the case, the processing module 120 considers that the disconnection of the Wi-Fi device 12C was merely temporary and that the backhaul network can remain on the initial channel. The processing module 120 then ends the method of FIG. 5 in a step 509. If the Wi-Fi device 12C has not reconnected to the initial channel, the processing module 120 returns to the step 502.

In the step 505, the processing module 120 causes the backhaul station module 1212 of the Wi-Fi device 12D to migrate to the backup channel used by the Wi-Fi device 12C.

In a step 506, the processing module 120 checks whether the Wi-Fi device 12C has reconnected to the initial channel. If such is not the case, the processing module 120 waits for a predefined period, for example equal to 20 minutes, and returns to the step 506. If the processing module 120 detects that the Wi-Fi device 12C has reconnected to the initial channel, in a step 508 it causes the backhaul station module 1212 of the Wi-Fi device 12D to migrate to the initial channel and ends the method described in relation to FIG. 5 in the step 509. Consequently, as long as a period since the last detection of a radar signal on the initial channel is not greater than or equal to the predefined period of 20 minutes, the backhaul station module 1212 remains on the backup channel.

FIG. 5 describes a method performed by a Wi-Fi device that is a child of a parent Wi-Fi device that made a DFS detection and migrated to a backup channel. It can be noted that, in the example in FIG. 5, the Wi-Fi device 12C is both a parent for the device 12D and a channel for the device 12A. The DFS detection by the Wi-Fi device 12C, because of its dual parent/child status, causes the migration of the backhaul access point module 1211 and backhaul station module 1212 of the Wi-Fi device 12C to a backup channel. If, following this migration, the Wi-Fi device 12D does not receive the frame containing the CSA element, the Wi-Fi device 12D performs the method described in relation to FIG. 5. For its part, following this migration, the Wi-Fi device 12A performs the method described in relation to FIG. 4.

The invention claimed is:

1. A method for managing a communication channel used by a plurality of Wi-Fi devices of a Wi-Fi network of the backhaul type in order to implement a backhaul network in said Wi-Fi network, wherein the method is executed by a first Wi-Fi device in the plurality and comprises:
   a) detecting that a second Wi-Fi device in the plurality connected directly to the first Wi-Fi device has disconnected from an initial channel of an initial sub-band by detecting that no Wi-Fi connection maintenance frame has been received, on the initial channel, coming from the second Wi-Fi device, during a predefined period, the initial channel being used by the plurality of Wi-Fi devices for implementing the backhaul network;
   b) following this detection, listening on each communication channel of a predefined sub-band, referred to as a backup sub-band, to which the second Wi-Fi device is able to migrate in order to implement the backhaul network in the event of detection, by the second Wi-Fi device, of a radar signal on the initial channel, the initial and backup sub-band being different;
   in the event of reception on a channel of the backup sub-band, referred to as a backup channel, by the first Wi-Fi device of a frame containing an identifier of the second device:
      causing the first Wi-Fi device to migrate to the backup channel;
      verifying whether the second Wi-Fi device has reconnected to the initial channel;
      in the case where the second Wi-Fi device has reconnected to the initial channel, causing the first Wi-Fi device to connect the second Wi-Fi device on the backup channel;
      otherwise, waiting during a predefined period and repeating said verifying; and
   otherwise, remaining on the initial channel in the case where the first Wi-Fi device determines that the second Wi-Fi device has reconnected to the initial channel, and, otherwise, repeating b).

2. The method according to claim 1, wherein the backup sub-band is a sub-band of a frequency sub-band that can be used by a Wi-Fi network whereon no detection of a radar signal is possible.

3. The method according to claim 2, wherein the backup channel is predefined in the backup sub-band.

4. The method according to claim 1, wherein each Wi-Fi device in the plurality comprises a plurality of radio modules, at least one first radio module being used for implementing the backhaul network using the initial channel and at least one second radio module being used for implementing an access network enabling Wi-Fi terminals to connect to one of the Wi-Fi devices implementing the backhaul network, and wherein, at each migration of a Wi-Fi device in the plurality to a backup channel, the Wi-Fi device uses a second radio module for communicating on the backup channel.

5. The method according to claim 1, wherein each Wi-Fi device in the plurality comprises a module, referred to as an access-point module, adapted for causing said Wi-Fi device to function in access-point mode in the backhaul network, and a module, referred to as a station module, adapted for causing said Wi-Fi device to function in station mode in the backhaul network, the first Wi-Fi device functioning in access-point mode vis-à-vis the second Wi-Fi device, which functions in station mode vis-à-vis the first Wi-Fi device, or the first Wi-Fi device functioning in station mode vis-à-vis the second Wi-Fi device which functions in access-point mode vis-à-vis the first Wi-Fi device.

6. A non-transitory storage medium storing a computer program comprising instructions for implementing, by a device, the method according to claim 1, when said instructions are executed by a processor of said device.

7. A Wi-Fi device included in a plurality of Wi-Fi devices in a Wi-Fi network of the backhaul type, the plurality of Wi-Fi devices implementing a backhaul network in the Wi-Fi network, wherein the Wi-Fi device, referred to as the first Wi-Fi device, comprises at least one processor configured to:

a) detecting that a second Wi-Fi device in the plurality connected directly to the first Wi-Fi device has disconnected from an initial channel of an initial sub-band by detecting that no Wi-Fi connection maintenance frame has been received, on the initial channel, coming from the second Wi-Fi device, during a predefined period, the initial channel being used by the plurality of Wi-Fi devices for implementing the backhaul network;

b) following this detection, listening on each communication channel of a predefined sub-band, referred to as a backup sub-band, to which the second Wi-Fi device is able to migrate in order to implement the backhaul network in the event of detection, by the second Wi-Fi device, of a radar signal on the initial channel, the initial and backup sub-band being different;

in the event of reception on a channel of the backup sub-band, referred to as a backup channel, by the first Wi-Fi device of a frame containing an identifier of the second device:

causing the first Wi-Fi device to connect the second Wi-Fi device on the backup channel;

verifying whether the second Wi-Fi device has reconnected to the initial channel;

in the case where the second Wi-Fi device has reconnected to the initial channel, causing the first Wi-Fi device to migrate to the initial channel;

otherwise, waiting during a predefined period and repeating said verifying; and otherwise, remaining on the initial channel in the case where the first Wi-Fi device determines that the second Wi-Fi device has reconnected to the initial channel, and, otherwise, repeating b).

8. A system comprising a plurality of devices according to claim 7, wherein each Wi-Fi device in the plurality comprises a module, referred to as an access-point module, adapted for causing said Wi-Fi device to function in access-point mode in the backhaul network, and a module, referred to as a station module, adapted for causing the Wi-Fi device to function in station mode in the backhaul network, the Wi-Fi devices in the plurality being organised in a parent/child hierarchy, a first Wi-Fi device in the plurality being the parent of a second Wi-Fi device in the plurality when it is functioning in access-point mode vis-à-vis the second Wi-Fi device, which for its part functions in station mode vis-à-vis the first Wi-Fi device, the plurality of Wi-Fi devices comprising at least one exclusively parent Wi-Fi device, and at least one exclusively child Wi-Fi device.

9. The system according to claim 8, wherein the plurality of Wi-Fi devices comprise at least one conjointly parent and child Wi-Fi device.

\* \* \* \* \*